(12) United States Patent
Heidt (10) Patent No.: US 8,077,929 B2
(45) Date of Patent: Dec. 13, 2011

(54) AMBIENT LIGHT REJECTION FILTER

(75) Inventor: Gerald Lee Heidt, Nibley, UT (US)

(73) Assignee: Wasatch Photonics, Inc., Logan, UT (US)

(*) Notice: Subject to any disclaimer, the term of this patent is extended or adjusted under 35 U.S.C. 154(b) by 1079 days.

(21) Appl. No.: 11/677,459

(22) Filed: Feb. 21, 2007

(65) Prior Publication Data

US 2007/0280514 A1    Dec. 6, 2007

Related U.S. Application Data

(60) Provisional application No. 60/775,755, filed on Feb. 22, 2006.

(51) Int. Cl.
*G06K 9/00* (2006.01)
*G06K 9/74* (2006.01)

(52) U.S. Cl. .......................... 382/115; 356/71

(58) Field of Classification Search ................ None
See application file for complete search history.

(56) References Cited

U.S. PATENT DOCUMENTS

| | | |
|---|---|---|
| 3,716,301 A | 2/1973 | Caulfield et al. |
| 3,743,421 A | 7/1973 | Maloney et al. |
| 3,968,476 A | 7/1976 | McMahon |
| 4,053,228 A | 10/1977 | Schiller |
| 4,227,805 A | 10/1980 | Schiller |
| 4,336,998 A | 6/1982 | Ruell |
| 4,525,859 A | 6/1985 | Bowles et al. |
| 4,728,186 A | 3/1988 | Eguchi et al. |
| 4,876,725 A | 10/1989 | Tomko |
| 5,109,427 A | 4/1992 | Yang |
| 5,146,102 A | 9/1992 | Higuchi et al. |
| 5,177,802 A | 1/1993 | Fujimoto |
| 5,446,290 A | 8/1995 | Fujieda et al. |
| 5,448,659 A | 9/1995 | Tsutsui et al. |
| 5,629,764 A * | 5/1997 | Bahuguna et al. ............ 356/71 |
| 5,708,497 A | 1/1998 | Fujieda |
| 5,740,276 A | 4/1998 | Tomko |
| 5,815,598 A | 9/1998 | Hara et al. |
| 5,892,599 A | 4/1999 | Bahuguna |
| 5,974,162 A | 10/1999 | Metz et al. |
| 6,002,499 A | 12/1999 | Corboline et al. |
| 6,061,463 A | 5/2000 | Metz et al. |
| 6,111,671 A | 8/2000 | Bahuguna et al. |
| 6,665,427 B1 | 12/2003 | Keagy et al. |
| 6,792,300 B1 | 9/2004 | Diab et al. |

(Continued)

OTHER PUBLICATIONS

Bahuguna, R.D.; Corboline, T. In Applied Optics, Sep. 10, 1996, vol. 35, No. 26, pp. 5242-5245 : Opt. Soc. America, Journal Paper.

(Continued)

*Primary Examiner* — Samir Ahmed
*Assistant Examiner* — Fred Hu
(74) *Attorney, Agent, or Firm* — Austin Rapp & Hardman (57) ABSTRACT

A fingerprint reader is described. The fingerprint reader includes an illumination source that produces light and a camera. An optical window is also part of the reader. The window is positioned so that light from the illumination source passes through the optical window and then is reflected to the camera for imaging a person's fingerprint. A filter may be positioned on or proximate to the optical window. The filter prevents ambient light from reaching the camera. In some situations, the filter will be a dielectric mirror, a dielectric filter, a holographic mirror, a holographic filter, a dichroic mirror or a dichroic filter.

13 Claims, 8 Drawing Sheets

U.S. PATENT DOCUMENTS

| | | | |
|---|---|---|---|
| 6,813,511 | B2 | 11/2004 | Diab et al. |
| 6,870,946 | B1 | 3/2005 | Teng et al. |
| 6,954,260 | B2 | 10/2005 | Arnold et al. |
| 6,954,261 | B2 | 10/2005 | McClurg |
| 2002/0041700 | A1 | 4/2002 | Therbaud |
| 2002/0085742 | A1 | 7/2002 | Bablumyan et al. |
| 2002/0106115 | A1 | 8/2002 | Rajbenbach |
| 2003/0206287 | A1 | 11/2003 | McClurg et al. |
| 2004/0041998 | A1 | 3/2004 | Haddad |
| 2004/0114783 | A1 | 6/2004 | Spycher et al. |
| 2004/0252867 | A1* | 12/2004 | Lan et al. ............ 382/124 |
| 2005/0043600 | A1 | 2/2005 | Diab et al. |
| 2005/0094128 | A1* | 5/2005 | Carver et al. ............ 356/71 |
| 2005/0105078 | A1 | 5/2005 | Carver et al. |
| 2005/0169506 | A1 | 8/2005 | Fenrich et al. |
| 2005/0249390 | A1 | 11/2005 | McClurg et al. |
| 2006/0028635 | A1 | 2/2006 | McClurg |
| 2006/0039048 | A1* | 2/2006 | Carver et al. ............ 359/32 |
| 2009/0116030 | A1 | 5/2009 | Bahuguna |

OTHER PUBLICATIONS

Gregory, D.A. In Applied Optics, Aug. 10, 1997, vol. 36, No. 23, pp. 5756: Opt. Soc. America, Journal Paper.

Bahuguna, R.D.; Corboline, T. In Applied Optics, Sep. 10, 1997, vol. 36, No. 26, pp. 6611 : Opt. Soc. America, Journal Paper.

Igaki, S.; Eguchi, S.; Yamagishi, F.; Ikeda, H.; Inagaki, T. In Applied Optics, Apr. 10, 1992, vol. 31, No. 11, pp. 1794-1802, Journal Paper.

Chennankara, B.; B.; Xu, W.Y.; Lin, F.C.; Drake, M.D.; Fiddy, M.A. In Applied Optics, Jul. 10, 1995, vol. 34, No. 20, pp. 4079-4082, Journal Paper.

Igaki, S.; Eguchi, S.; Shinzaki, T. In Fujitsu Scientific and Technical Journal, Winter 1989, vol. 25, No. 4, pp. 287-296, Journal Paper.

Cross Match Technologies; http://www.crossmatch.com/products/ver_300.html.

Hashimoto, S.; Hata, Y.; Miyoshi, Y.; Yamato, K. In Journal of the Institute of Television Engineers of Japan, Sep. 1990, vol. 44, No. 9, pp. 1246-1252.

Eguchi, S.; Igaki, S.; Yamagishi, F.; Ikeda, H.; Inagaki, T. In Proceedings of the SPIE—The International Society for Optical Engineering, 1989, vol. 1051, pp. 129-1234, Conference Paper; Journal Paper.

Igaki, S. et al. (1990); Fujitsu-Sci Tech J. 25(4):287-296.

Drake et al., Optical Engineering 35:9, Sep. 1996.

Cross Match Technologies; http://www.crossmatch.com/products/ver_300.html, Jun. 2009.

\* cited by examiner

AMBIENT LIGHT REJECTION FILTER

CROSS-REFERENCE TO RELATED APPLICATION

This application claims the benefit of U.S. Provisional Patent Application No. 60/775,755 entitled "Ambient Light Rejection Filter," which was filed Feb. 22, 2006. This prior provisional application is expressly incorporated herein by reference.

TECHNICAL FIELD

The invention pertains to biometric fingerprint readers that may be used to optically scan and/or electronically record a person's fingerprint.

BACKGROUND

Biometric fingerprint readers are currently used in many locations as a means of identifying particular individuals. In general, these devices operate to scan a person's fingerprint into an electronic format. Once this electronic copy of the fingerprint has been obtained, this fingerprint may then be compared with a database to determine if the person that gave the fingerprint is a criminal, terrorist, or other individual wanted by a law enforcement agency. It is for this reason that fingerprint readers are often used at border checkpoints, airports, and other public locations as a means of detecting known criminals.

Typical examples of fingerprint scanners disclosed in the art are found in U.S. Patent Application Publication No. 2004/0252867 and U.S. Pat. No. 5,892,599. Both of these documents are expressly incorporated herein by reference.

Further, fingerprint scanners are also used as a security feature on buildings, briefcases, safes, and/or other secure locations. Specifically, the fingerprint scanner obtains the electronic copy of the person's fingerprint and then compares this fingerprint with a known database to determine whether this individual is authorized to enter the building, open the safe, etc. If the person's fingerprint matches one of the records in the database, the building, briefcase, secure area, etc. will immediately be unlocked and the person will be granted access to the secure location. Of course, if the fingerprint does not match with known records, access to this secure location will be denied.

The above-recited list is but two examples of current usages for fingerprint readers. Other potential applications and usages for fingerprint readers are also possible.

Some fingerprint readers operate using the principle of "total internal reflection" or "TIR". More specifically, the fingerprint reader contains an optical window designed such that when light is shined on the internal side of this optical window, the glass will totally reflect this light internally. However, when a person places his or her finger on the optical window (and light is added), the natural oils found in the person's finger frustrates/overcomes the TIR properties of the glass. Accordingly, some of the light will pass through the optical window and some of the light will be reflected back into the reader. More importantly however, the light that is reflected back into the reader contains an image of the person's fingerprint. Thus, if this reflected light is directed onto a camera (or other recording device), and electronic image of the person's fingerprint may be obtained. Once this electronic image of the fingerprint is obtained, this image may then be processed, compared to a database, or otherwise manipulated as desired.

Unfortunately, with fingerprint readers that use TIR, there is a problem with ambient light that must be addressed. Specifically, it is possible for ambient light (from the outside of the reader) to pass through the optical window where the finger is placed. If this ambient light reaches the camera, it will degrade the image of the fingerprint and/or reduce the precision/sensitivity of the fingerprint image.

Ambient light can also saturate the camera and can make detection of the light containing the fingerprint image very difficult. In fact, ambient light reaching the camera may be ten to twenty times brighter than the light containing the fingerprint image. Given that the camera will generally use a "wide-open" camera setting to gather as much light as possible, this ambient light can simply "drown out" the light containing the image. When this occurs, the ability of the reader to produce a precise fingerprint image is greatly diminished.

Further, when ambient light is allowed to reach the camera, a latent fingerprint that is left on the optical window (i.e., a fingerprint from a previous person) can be detected. The latent image can also be intentionally illuminated with an outside light source and fool the system.

In order to compensate for the effects of ambient light, a filter is often used in conjunction with the camera. More than one filter may be used. These filters are designed to select a narrow spectrum of light reaching the camera, thereby reducing any stray images that may be present in the ambient light. The use of these filters reduces the amount of ambient light that can enter the camera. However, even with the use of a filter, there is still the narrow spectrum of light (that is present in ambient light or intentionally introduced) that can pass though the filter and can still reach the camera. Thus, even with the use of filters, many fingerprint readers still must be surrounded by a dark area (i.e., free of ambient light) in order to achieve maximum performance and sensitivity.

Accordingly, a new type of filter is needed. Such a device is disclosed herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

A fingerprint reader is described. The fingerprint reader comprises an illumination source that produces light and a camera. An optical window is also part of the reader. The window is positioned so that light from the illumination source passes through the optical window and then is reflected to the camera for imaging a fingerprint. A filter may be positioned on or proximate to the optical window. The filter prevents ambient light from reaching the camera. In some embodiments, the filter may be a dielectric element, a holographic element, or a dichroic filter. Further embodiments may be designed in which the reader includes a holographic optical element, and wherein light from the illumination source passes through the holographic optical element prior to contacting the filter.

Additional embodiments may also be made in which the surface of the filter is curved. Other embodiments may be designed in which the filter used in the reader is a holographic element that creates a curved wave front that effectively operates as a curved filter surface. Still further embodiments may be designed in which the filter is used in conjunction with a holographic optical element, and wherein the filter deflects zero order light that is produced by holographic optical element away from the camera.

In some embodiments, the fingerprint reader may also include a prism or glass block. In these embodiments, light from the illumination source passes through the prism or glass block prior to reaching the optical window. Further embodiments may be designed in which the filter is added to a surface of the prism or glass block.

Further embodiments may be constructed in which the camera used in the reader may be a CCD that includes at least one camera filter. The fingerprint reader may also operate to digitally communicate a fingerprint image to a computing device.

Additional embodiments may be designed in which the filter used in the fingerprint reader operates to block ambient light based upon the angle upon which the ambient light strikes the filter. Yet additional embodiments are designed in which the filter is a thin film element added to the top of the optical window.

An optical window is also described. The optical window may be used on a fingerprint reader having a camera. The optical window comprises a filter that prevents ambient light from reaching the camera, wherein light from an illumination source passes through the filter and then is reflected by total internal reflection (TIR) by the optical window.

A method for increasing the sensitivity of a fingerprint reader is also described. The method may comprise the step of obtaining a fingerprint reader. This fingerprint reader comprises an illumination source that produces light and a camera. An optical window is also added to the reader, wherein light from the illumination source passes through the optical window and then is reflected to the camera for imaging a fingerprint. A filter is also added to the reader. The filter may be positioned on or proximate the optical window. The method also includes the step of using the filter to block ambient light from reaching the camera.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Figure 1:
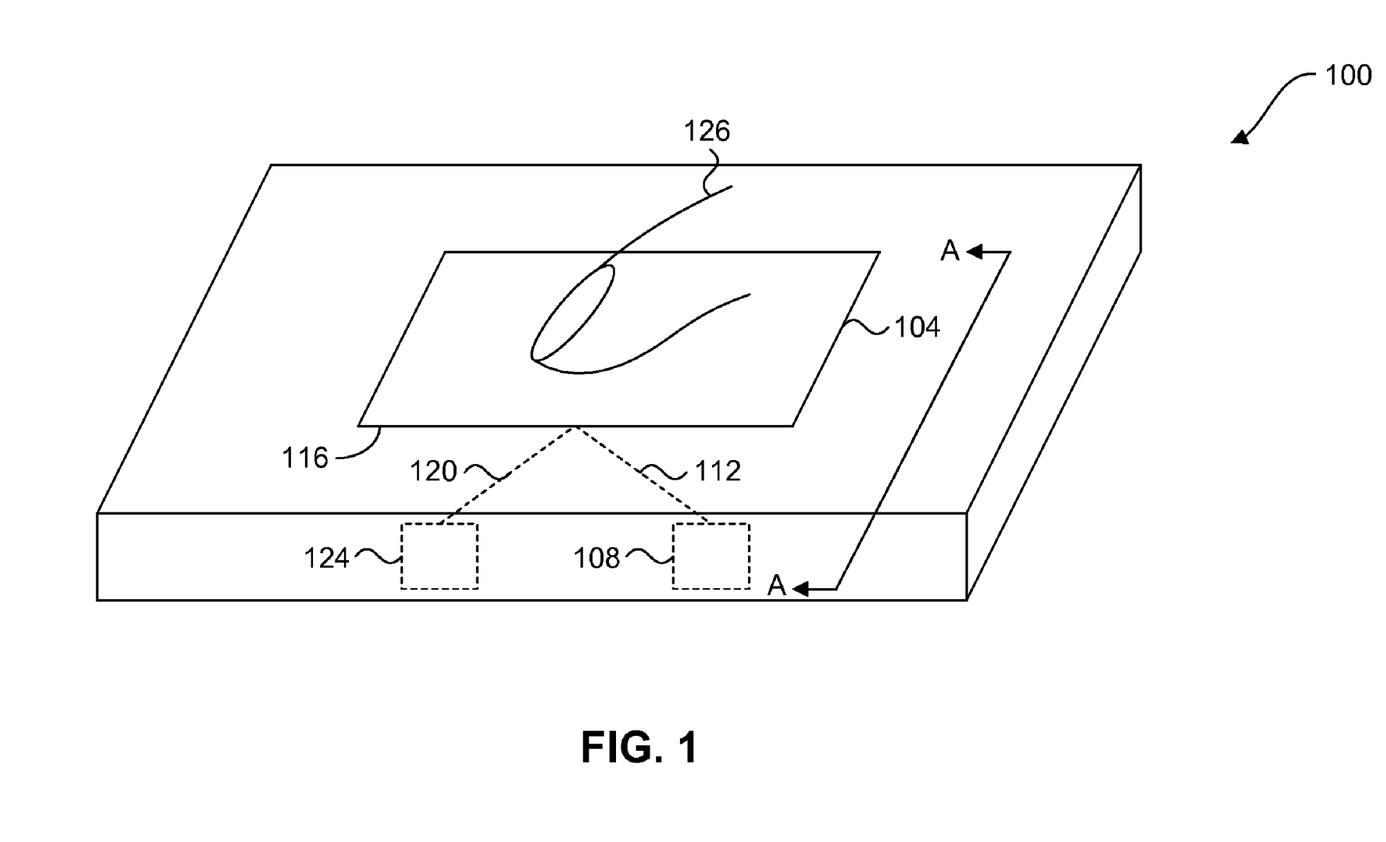
FIG. 1 is a perspective view of an embodiment of a fingerprint reader

Referring now to FIG. 1, an exemplary fingerprint reader 100 according to the present embodiments is illustrated. FIG. 1 is a perspective view of the fingerprint reader 100. The reader 100 contains an optical window 104. The optical window 104 is made of glass or another translucent material. The reader 100 is designed such that it may image a person's fingerprint when the person's finger is placed on the optical window 104.

In order to image the person's fingerprint, the reader 100 includes an illumination source 108 that produces a quantity of illuminating light 112. Any type of device that is capable of producing light and/or electromagnetic radiation may be used as the illumination source 108. This illumination source 108 may be a light source that produces electromagnetic radiation that has a wavelength in the range visible to the human eye. In some embodiments, the illumination source 108 produces "white" light that contains all of the different colors of the visible spectrum. In other embodiments, the illumination source 108 produces only a particular color of the visible spectrum (such as green light, yellow light, orange light, etc.). In other embodiments, the illumination source 108 produces electromagnetic radiation that has a wavelength outside the region detectable by the human eye (such as ultraviolet light, infra-red light, etc.) In other embodiments, the illumination source 108 may comprise an LED.

In some embodiments, the illumination source 108 may be offset from the optical window 104 such that light 112 produced by the illumination source 108 may strike the internal side 116 of the optical window 104 at an angle other than 90 degrees. Once the light 112 strikes the internal side 116, the light will be reflected off of the optical window 104. This reflection of the illumination light 112 is referred to herein as "total internal reflection" or "TIR." Once the light has been reflected off the optical window 104, the reflected light 120 may contact a camera 124. As used herein, the term "camera" means any type of device capable of detecting, recording, and/or measuring the reflected light 120. In the embodiment shown in FIG. 1, the camera is a CCD (a charge-coupled device). Other types of devices may also be used as the camera 124.

The fingerprint reader 100 is designed such that a person may place his or her finger 126 on the optical window 104. Once the finger 126 is properly positioned, light 112 from the illumination source 108 may strike the optical window 104. The natural oils that exist in the finger 126 overcome, at least in part, the total internal reflection of the light 112. Accordingly, some of the light 112 is not reflected to the camera 124. Although not all of the illumination light 112 reaches the camera 124, the reflected light 120 that does actually reach the camera 124 will contain an image of the person's fingerprint. This image of the person's fingerprint may then be captured by the camera 124.

As shown in FIG. 1, the reader 100 is designed to image the fingerprint found on the index finger of the person's right hand. Other embodiments may be designed to image the print found on one or more of the person's other fingers (such as the person's thumb, middle finger, ring finger, "pinkie" finger, etc.). Additional embodiments may be designed to image one or more fingerprints found on the person's left hand. Still further embodiments may be designed to simultaneously read the prints found on a plurality of the person's fingers (such as three fingers, four fingers, etc.). Still further embodiments may be designed to read other biometric markings found on the person's body as a means of identifying the particular individual.

Figure 2:
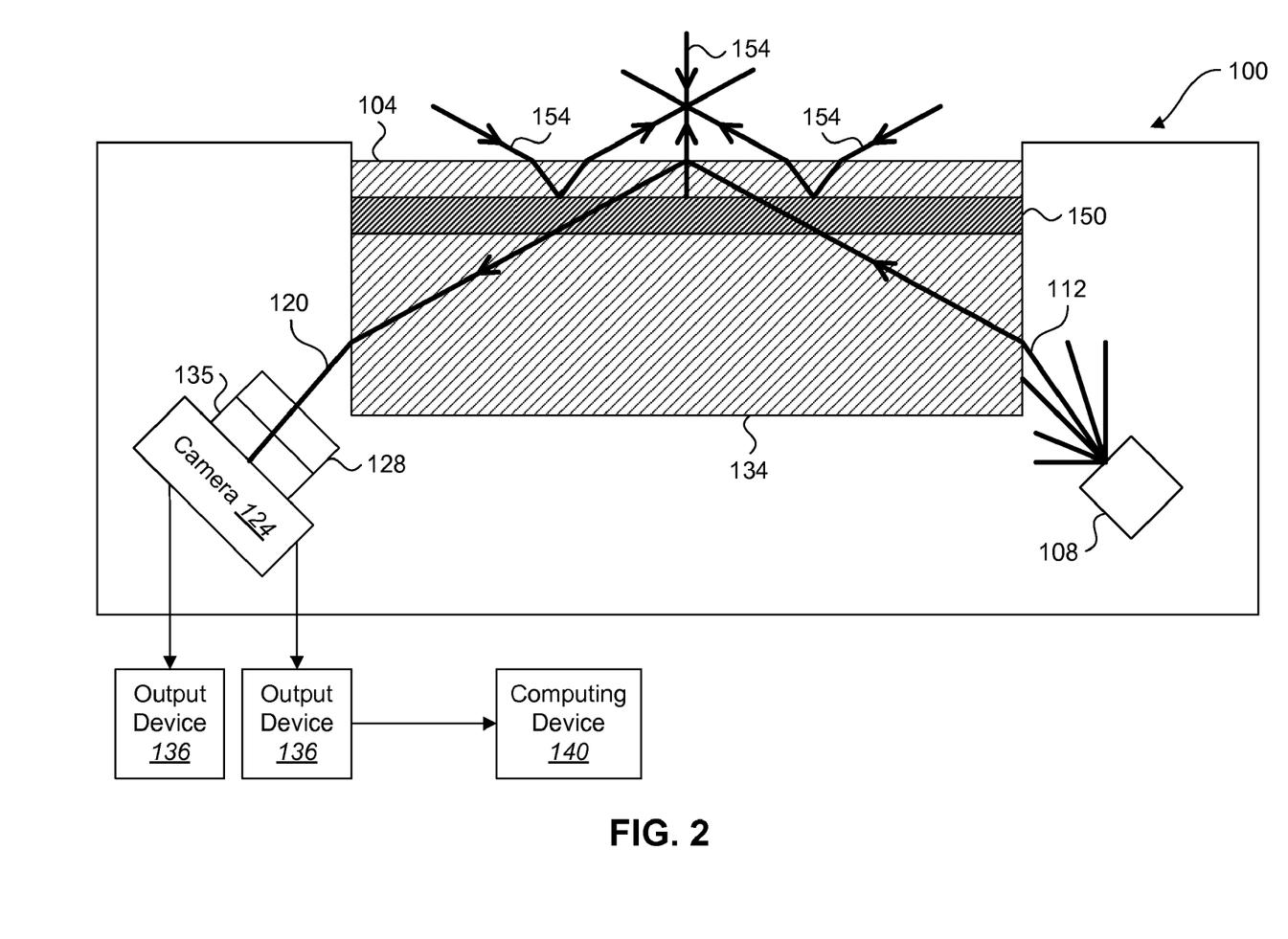
FIG. 2 is a cross-sectional view taken along the line A-A of FIG. 1.

FIG. 2 is a cross-sectional view taken along the line A-A of FIG. 1. FIG. 2 illustrates further aspects of the reader 100 and the way in which the reader 100 may operate to image a fingerprint. As shown in FIG. 2, a camera filter 128 may also be used in conjunction with the camera 124. The filter 128 may be used to restrict/filter the light that reaches the camera 124 to a specific color/wavelength. For example, if the illumination light 112 is "green light", then a filter 128 may be used to only allow green light to reach the camera 124. In this manner, any stray light (noise) and ambient light may be reduced from reaching the camera 124, thereby increasing the sensitivity of the fingerprint reader 100.

A prism (not shown in FIG. 2) may also be added to the fingerprint reader 100. The prism may be located between the illumination source 108 and the optical window 104. In some embodiments, the prism may be used to focus a particular color of light onto the optical window 104. In other embodiments, the prism may assist in reducing distortion of the image. In further embodiments, the prism is a holographic prism. Of course, other similar devices (such as holographic optical elements) may be used in other embodiments either in place of the prism or in conjunction with the prism. Further embodiments may be constructed in which the prism is omitted from the fingerprint reader 100.

A glass block 134 may also be added to the reader 100. The glass block 134 could be used to replace the prism. In some embodiments, the glass block 134 may be a portion of the optical window 104. In other embodiments, the block 134 is used to house the optical window 104. The glass block 134 may be made of a translucent material that will allow light (such as illumination light 112 and reflected light 120) to pass through the glass block 134.

It should be noted that the camera 124 and/or the reader 100 may include other optical elements 135 that improve the quality of the imaged fingerprint. These other elements 135 may include image enhancement, image modification, image processing, reduction of noise, etc. Likewise, the image of the fingerprint may be processed by the reader 100, as necessary.

As shown in FIG. 2, the camera 124 may communicate with an output device 136. More than one output device 136 may also be used. In some embodiments, the output device 136 may be a screen or other type of display device that allows individuals to view the image of the fingerprint. Other examples of different kinds of output devices 136 include a speaker, printer, etc. In other embodiments, the output device 136 is a communication interface (such as a modem, Ethernet card, USB port, CD drive, thumbnail drive, or any other form of wireless or wired communication device/mechanism) that allows the image of the fingerprint to be transferred to a computing device 140 or other similar processing device. (This computing device 140 is described in greater detail in conjunction with FIG. 6). Other examples of the communications interface include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

Once the image of the fingerprint has been processed, it may be compared to a database of other fingerprints to verify the person's identity, determine if the person is authorized to access a secured area, etc. In some embodiments, the computing device 140 will be a separate computer to which the reader 100 is attached. In other embodiments, the computing device 140 may simply be a part of the reader 100.

The reader 100 of the present embodiments also includes an ambient light filter 150 that is designed to prevent or block ambient light 154 from reaching the camera 124. The ambient light filter 150 may be added to the optical window 104. In other embodiments, the filter 150 may be added to the top surface of the glass block 134 (or prism). "Ambient light" 154 is the light that is present in the environment outside of the fingerprint reader 100. This ambient light may be sunlight, light produced by external light sources, etc.

As used herein, the term "ambient light filter" refers to any device that is capable of blocking/preventing the ambient light from reaching the camera 124. Thus, the ambient light filter 150 may, in some embodiments, take the form of a "filter" (or filter-like device) that blocks the ambient light. In other embodiments, the ambient light filter 150 may be a mirror or a mirror-like element that reflects ambient light 154 away from the reader 100 (and/or the optical window 104).

The ambient light filter 150 may be a holographic element, such as a holographic mirror or holographic filter. In other embodiments, the ambient light filter 150 may be a dielectric element, such as a dielectric mirror or dielectric filter. In further embodiments, the ambient light filter 150 may be a dichroic element, such as a dichroic mirror or dichroic filter. In other embodiments, the ambient light filter 150 may be a thin film diffraction element that reflects the ambient light 154. In other embodiments, the ambient light filter may be any or all combinations of the aforementioned embodiments. Other types of devices/elements that are capable of preventing the ambient light 154 from reaching the camera 124 may also be used as the ambient light filter 150. In the embodiment shown in FIG. 2, the filter 150 is a holographic mirror.

As shown in FIG. 2, the ambient light filter 150 may be a "thin film" deposition that is added to the top surface of the glass block 134. However, in other embodiments the ambient light filter 150 may be positioned within the optical window 104.

It should be noted that the ambient light filter 150 does not filter/block the illumination light 112 from the illumination source 108; rather, this light 112 is unaffected by the filter 150 and is allowed to reflect onto the camera 124. The ambient light filter 150 does, however, block all or part of the ambient light 154 and may operate to prevent the ambient light 154 from accessing the camera 124. Specifically, when the ambient light 154 contacts the filter 150, this light 154 will be reflected away from the optical window 104, thereby preventing the light 154 from accessing the interior of the reader 100 and contacting the camera 124.

In some embodiments, the filter 150 is selected such that it blocks the particular wavelength of the ambient light 154. Thus, as the wavelength of the ambient light 154 is not within the allowed wavelength range associated with the filter 154, this ambient light is blocked. For example, the ambient light filter 150 may be selected such that only "green" light is blocked through the filter 150. All of the ambient light 150 that is not green light will thus pass through the filter 150 and be blocked by filter(s) 128.

Further embodiments may be constructed in which the ambient light filter 150 blocks the ambient light 154 based upon the angle at which the ambient light 154 contacts the filter. This means that if the light contacts the filter 150 at a desired angle, this light will not be filtered, whereas when light that is outside of the desired range contacts the filter 150, this light will be blocked. In general, the filter 150 is arranged such that the light 112 from the illumination source 108 contacts the filter 150 at the desired angle, and thus, this light 112 is not affected by the filter 150. However, the ambient light 154 strikes the filter 150 at a much steeper angle (i.e., at an angle that is outside of the desired filter range), and thus, this ambient light 154 is rejected by the filter 150.

It should be noted that embodiments may be constructed in which the filter 150 operates to filter the ambient light 154 using both wavelength restrictions (such as only allowing "green light") as well as restriction based upon the angle that the light contacts the filter 150. These filters 150 which are based both on the wavelength and contact angle of the light may provide maximal filtration of the ambient light, and thus, may be preferred in some embodiments.

Figure 2A:
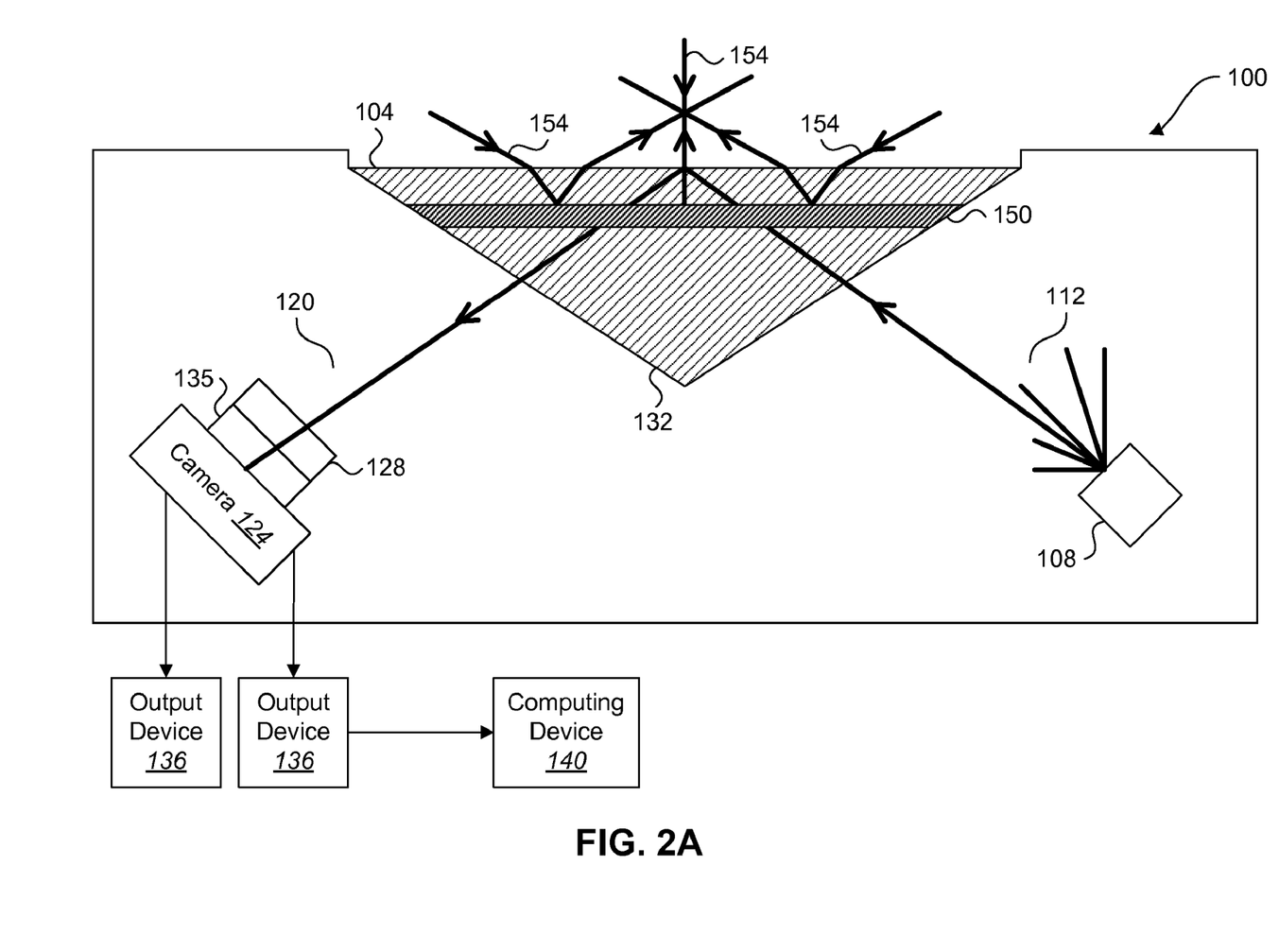
FIG. 2A is a cross-sectional view of another embodiment of a fingerprint reader.

Referring now to FIG. 2A, a further embodiment of a reader 100 is illustrated. The reader 100 is similar to that which is shown in FIG. 2. In the embodiment shown in FIG. 2A, a prism 132 has been used in place of the glass block 134. However, in all other aspects, the embodiment shown in FIG. 2A may be similar to, or even identical to, that which is shown in FIG. 2. As with the previous embodiments, the filter 150 operates to block the ambient light 154 and prevents this light from reaching the camera 124. In other embodiments, the filter 150 will be added to a surface of the prism 132.

Figure 3:
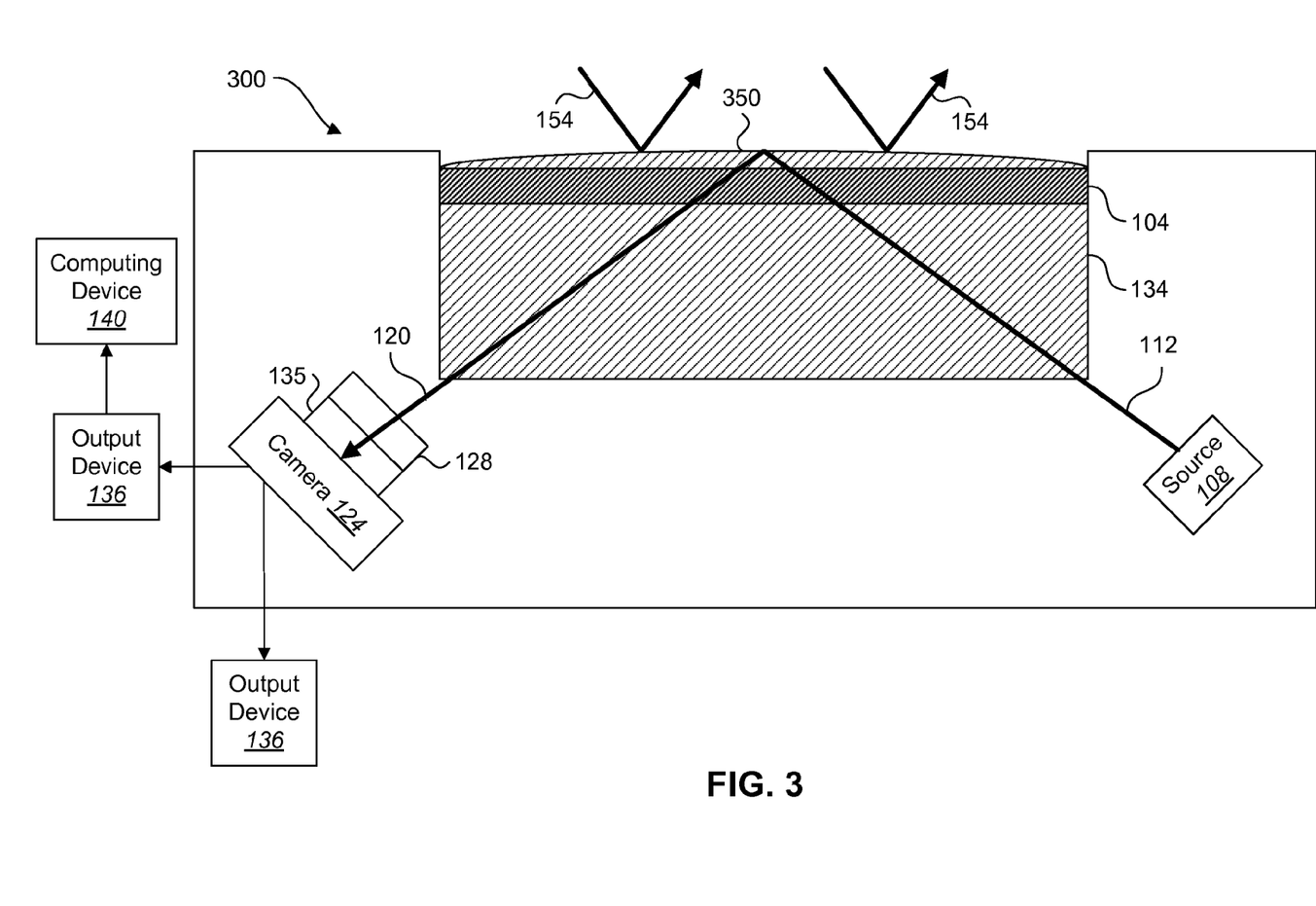
FIG. 3 is a cross-sectional view of another embodiment of a fingerprint reader.

Referring now to FIG. 3, another embodiment of a reader 300 is shown. FIG. 3 is a cross-sectional view that is similar to the view shown in FIG. 2. The reader 300 is similar to the reader 100 of FIGS. 1 and 2. Accordingly, some of the elements of the reader 300 are similar and/or identical to that which was discussed in conjunction with FIGS. 1 and 2. For purposes of brevity, this discussion will not be repeated.

The reader 300 is similar to the embodiment of FIG. 2 in that it comprises a glass block 134 rather than a prism. However, similar embodiments may be constructed in which a prism is used instead of the glass block 134.

The reader 300 of FIG. 3 differs from the reader 100 of FIGS. 1 and 2 with respect to the filter. Specifically, the filter 350 is added to the reader 300. The filter 350 is added to a top surface of the optical window 104. In some embodiments, this filter 350 is a thin film that is added to the top surface of the window 104. Of course, other embodiments may be designed in which the filter 350 is added to the glass block 134 (such as by coating the glass block 134 as shown in FIG. 2). In some embodiments, it may be appropriate to place the filter 350 on the glass block 134 because such positioning may protect the filter 350.

Although the filter 350 is similar to the filter 150 discussed above, the filter 350 has a curved profile. This curved profile allows the radius (amount) of the ambient light 154 rejected by the filter 350 to be increased. In some embodiments, adding a curvature to the filter 350 means that a greater number of wavelengths of light will be rejected by the filter 350. In other embodiments, the curvature of the filter 350 affects the specific angle that the light needs to contact the filter 350 in order for the ambient light 154 to pass through the filter 350. Specifically, by giving the filter 350 a curved profile, the number of contact angles for the light to pass through the filter 350 is reduced. Thus, in some embodiments, by making the filter have a curved profile, more of the ambient light 154 may be blocked by the filter 350.

There are multiple ways in which the filter 350 may be constructed to have a curved profile. For example, the filter 350 may simply be constructed with a physically curved profile. As the filter 350 is a thin film that is added to the top of the optical window 104, making this thin film have a curved profile may be accomplished by adding different amounts of material to different areas of the surface. However, in other embodiments, the filter 350 may have an "effective curved profile" by creating a curved wave front on a flat plane holographically. In other words, if the filter 350 is a holographic element, the holographic element may be designed such that the filter 350 has the properties of a curved filter 350, even though the holographic element actually has a flat profile. Both filters that have a physical curved profile and those filters that have an "effective curved profile" fall within the present embodiments.

Figure 3A:
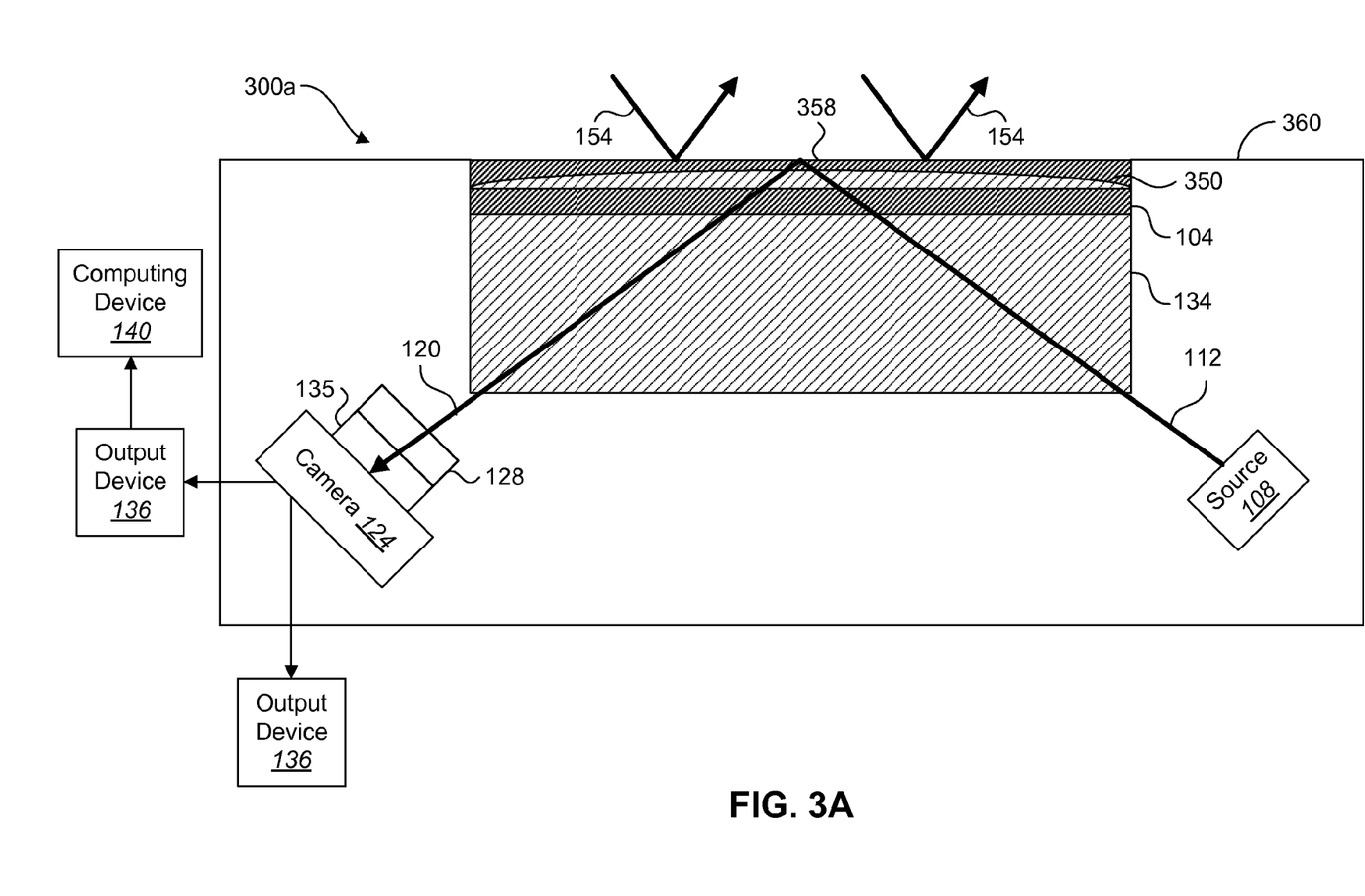
FIG. 3A is a cross-sectional view of another embodiment of a fingerprint reader.

Referring now to FIG. 3A, another embodiment of a reader 300a is shown. FIG. 3A is a cross-sectional view that is similar to the view shown in FIG. 3. Both the reader 300a of FIG. 3A and the reader 300 of Figure have a curved profile. In fact, the difference between the reader 300a and the reader 300 of FIG. 3 is that the reader 300a has a cover plate 356 which has been positioned on top of the curved filter 350. This cover plate 356 has a top surface 358 that may match the top surface 360 of the reader 300a. Accordingly, even though the filter 350 has a curved profile, the overall appearance of the reader 300a will be that of a device that has a flat surface.

It should be noted that the embodiment of the reader 300a of FIG. 3A may be used to gather images of fingerprints, whereas the embodiment of the reader 300 of FIG. 3, with the curved top surface, may be used to collect images or print of the user's palm (or other biometric markings on the person's body). However, embodiments of the reader 300 of FIG. 3 may also be used to image a person's fingerprint.

Figure 4:
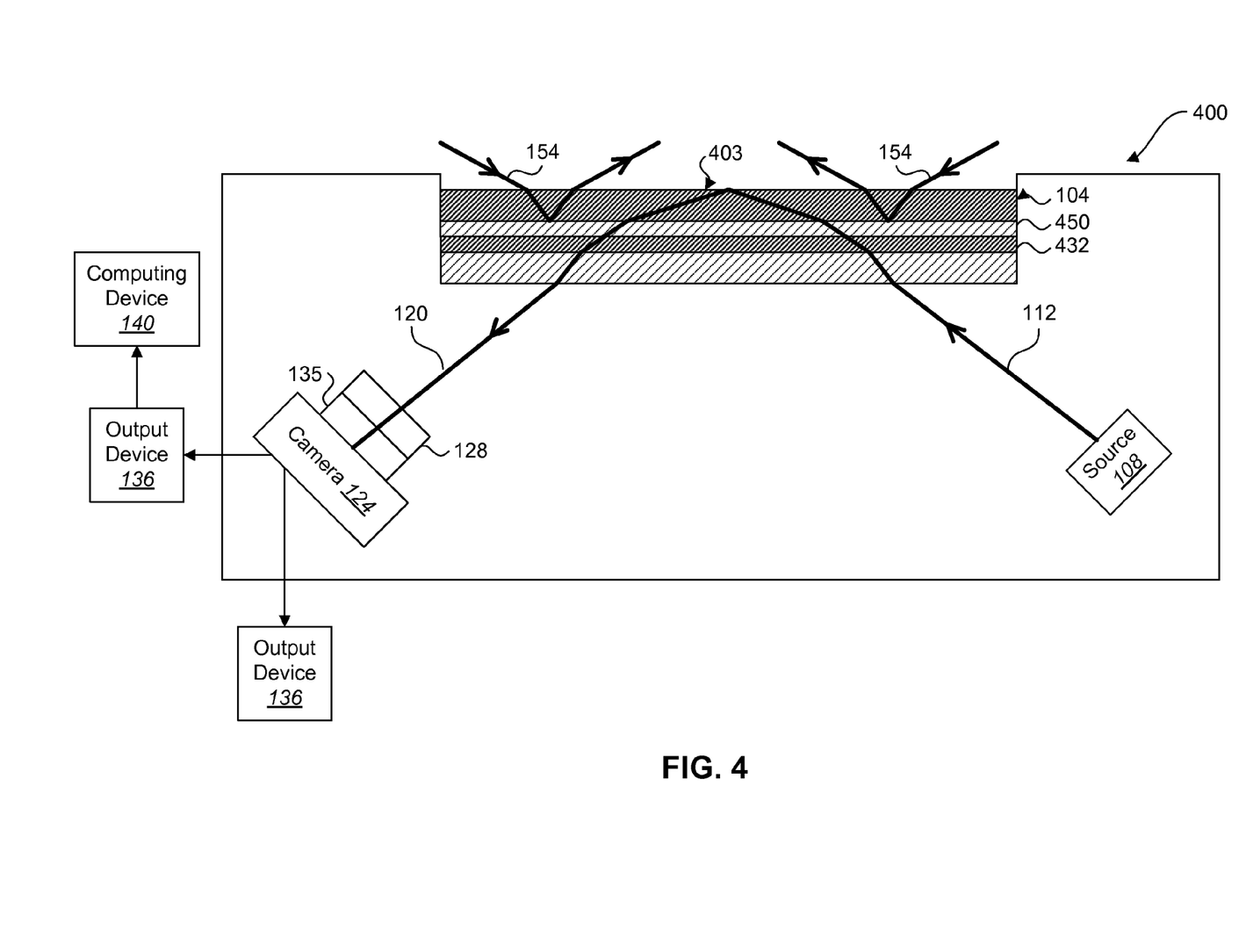
FIG. 4 is a cross-sectional view of another embodiment of a fingerprint reader.

Referring now to FIG. 4, a cross-sectional view illustrates another embodiment of a reader 400 as disclosed herein. FIG. 4 is a cross-sectional view that is similar to the view shown in FIG. 2. The reader 400 is similar to the readers previously discussed. Accordingly, some of the elements of the reader 400 are similar and/or identical to that which was discussed above. For purposes of brevity, this discussion will not be repeated.

Unlike the embodiments discussed above, the reader 400 does not include a prism or glass block; rather, in the embodiment of FIG. 4, the reader 400 includes a holographic optical element or holographic prism 432. The holographic optical element 432 performs the same functions as the prism. Of course, in further embodiments, a holographic optical element 432 may be used in conjunction with a prism. If the holographic optical element 432 is used with a prism, it may be possible to reduce or eliminate "keystone." "Keystone" is caused when the image surface of a camera array is not parallel to the surface of imaging platen of the finger print reader. The difference in the depth of field from one end of the image to the other makes one side wider than the other like a keystone. When this happens the image needs to be compensated for with the use of computer software. This reduces the amount of usable resolution of the camera and increases the processing time of the image. The holographic prism can be designed so that the camera is directly in line with the imaging surface. A holographic optical element can also be incorporated with a prism to redirect the light to make the image in line with the camera. This eliminates "keystone" and the associated problems.

When a holographic optical element 432 is used instead of a prism, ambient light 154 may be of greater concern since the ambient light 154 can pass through the grating or the holographic optical element 432 more readily than it can pass through a prism. Accordingly, if a holographic optical element 432 (which is sometimes called a "HOE") is used as part of the reader 400, a filter 450 may be used with the holographic optical element 432.

The filter can be placed on any of the surfaces above HOE 432. In the embodiment shown in FIG. 4, the filter 450 is positioned above the holographic optical element 432. The filter 450 is not, however, positioned on a top surface 403 of the optical window 104. Instead, the filter 450 is positioned beneath the surface of the optical window 104. Of course, further embodiments may also be constructed in which the filter 450 is positioned on a top surface of the optical window 104. In some embodiments, the diffractive element or ambient light filter is a coating on the cover glass substrate. The coating could be on either side of the substrate. In some embodiments, in may be practical to place the coating on the opposite side of the optical window (i.e., an interior side) for protection.

As the filter 450 is positioned below the top surface 403 of the optical window 104, ambient light 154 may actually pass through the top surface 403 of the optical window 104. However, upon contacting the filter 450, this ambient light 154 may be reflected away from the top surface 403 and out of the reader 400. Thus, the ambient light 154 is prevented from accessing the camera 124.

Figure 5:
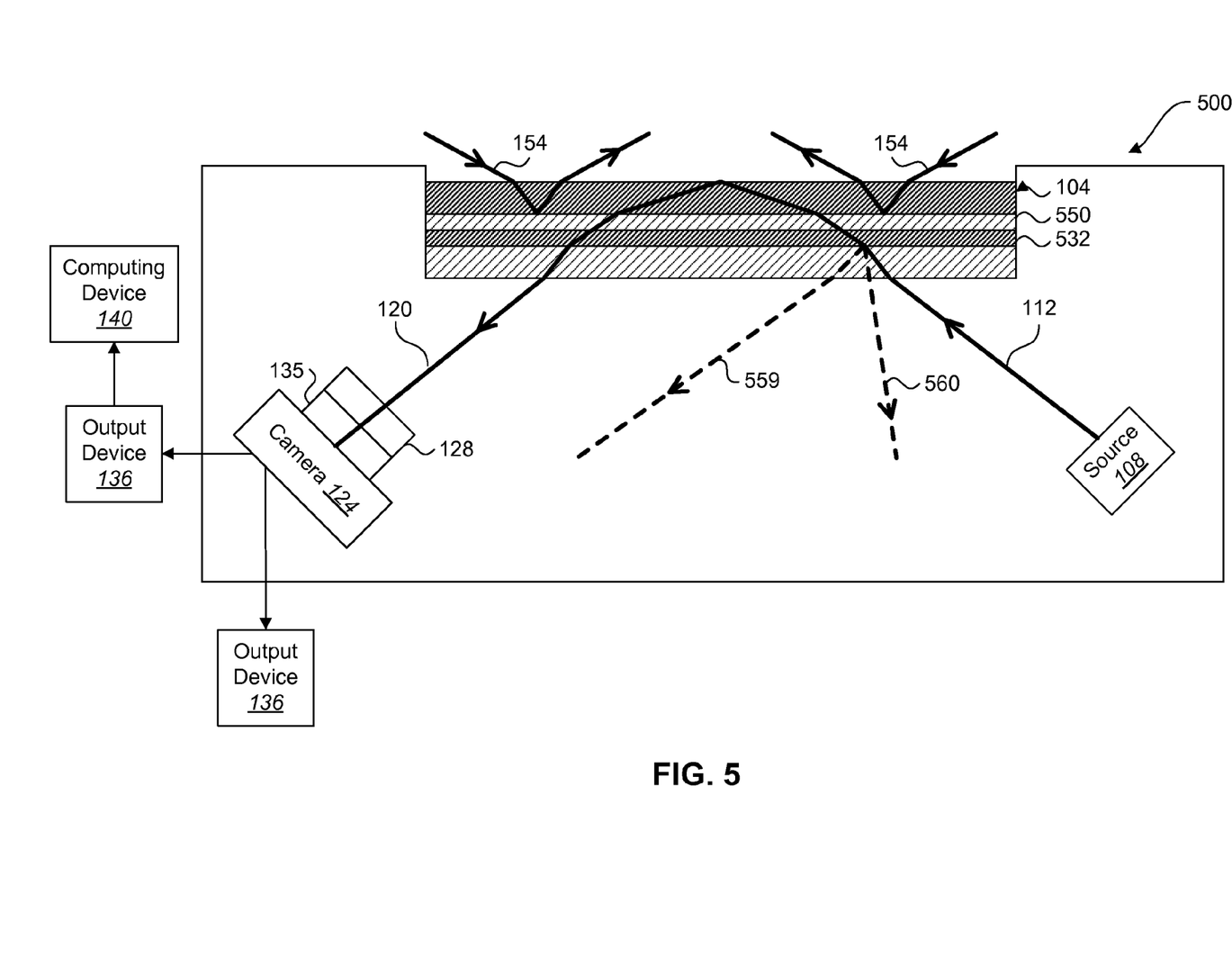
FIG. 5 is a cross-sectional view of a further embodiment of a fingerprint reader.

Referring now to FIG. 5, a further embodiment is illustrated. FIG. 5 is a cross-sectional view that is similar to the view shown in FIG. 2 and illustrates a fingerprint reader 500. The reader 500 is similar to the readers discussed above. Accordingly, some of the elements of the reader 500 are similar and/or identical to that which was discussed above. For purposes of brevity, this discussion will not be repeated.

Specifically, the reader 500 is similar to the reader 400 in that it has a holographic optical element 532 and a filter 550 that is positioned below a top surface 503 of the optical window 104. In some embodiments, the holographic optical element 532 may be a holographic grating. In other embodiments, a separate prism, holographic optical grating (or other feature) may also be added. However, unlike the embodiment of FIG. 4, the filter 550 is further configured such that it will redirect stray "zero order" illumination light 560 away from the camera 124. Accordingly, this "zero order" light 560 does not access or reach the camera 124. "Zero order" light 560 is a product of the holographic optical element 532 that is used in the reader 500. With each holographic optical element, "S-polarized light" and "P-polarized" light is formed. The "S-polarized" light is allowed to pass through the filter 550 so that it may be reflected to the camera 124 (and will provide the image of the fingerprint). This "P-polarized" light is referred to as "zero order" light. In order to prevent the "P-polarized" light 560 from creating background noise and/or interfering with the imaging of the fingerprint, the filter 550 is designed to reflect/direct the "P-polarized" light away from the camera 124. In some embodiments with a standard planer symmetrical mirror, the zero order light 559 could be reflected toward the camera 124 (or in a direction proximate the camera 124). All dielectric, dichroic and standard holographic mirrors will do this. However, a holographic mirror 532 can be designed to redirect the zero order light 560 away from the camera 124. (This re-direction would work or operate in a non-symmetric pattern.) In some embodiments, the exact angle of re-direction may not be important as long as this light is directed away from the camera 124. Thus, in these embodiments in which the zero order light is directed away from the camera 124, the sensitivity of the reader 500 may be increased.

Figure 6:
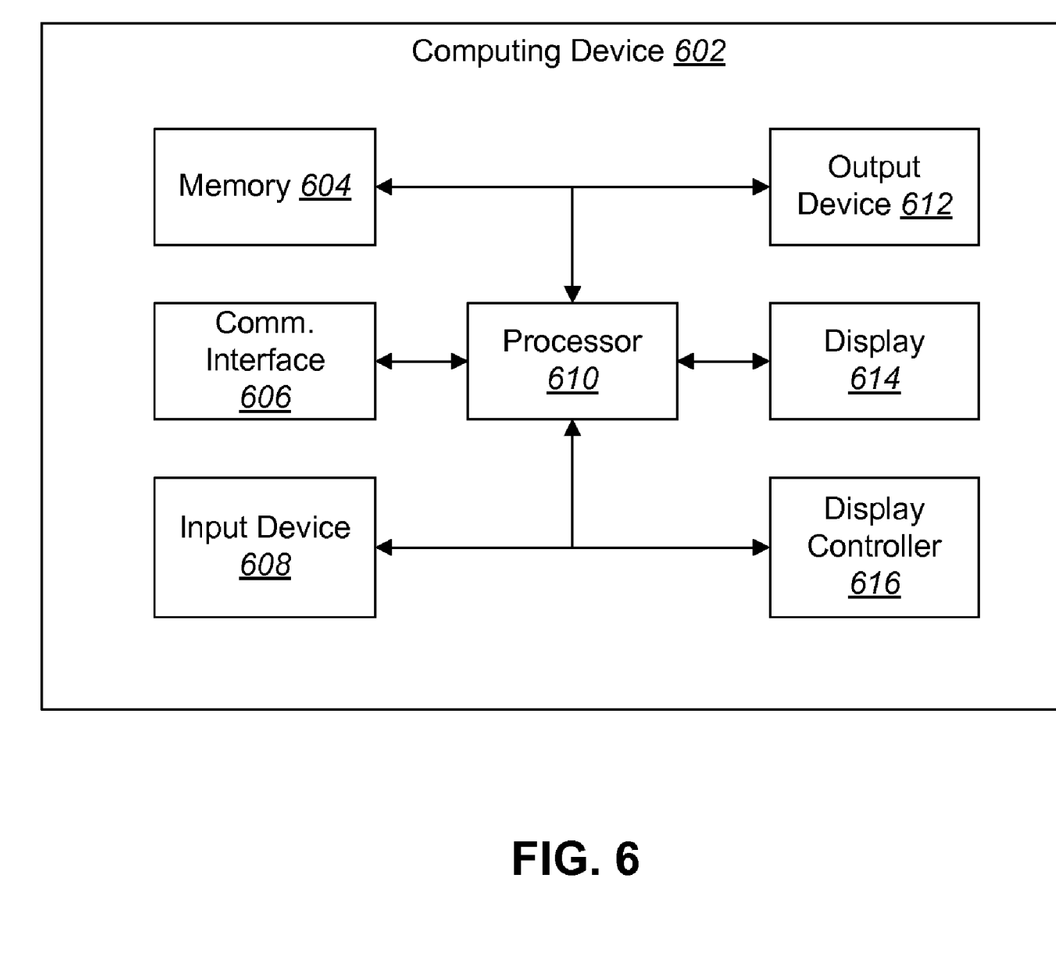
FIG. 6 is a diagram of an embodiment of a computing device that may be used in conjunction with one or more of the fingerprint readers of the present embodiments.

FIG. 6 illustrates various components that may be utilized in a computing device 602 that may be used, for example, as the computing device 140 of FIG. 2. The illustrated components may be located within the same physical structure or in separate housings or structures.

The computing device 602 includes a processor 610 and memory 604. The processor 610 controls the operation of the computing device 602 and may be embodied as a microprocessor, a microcontroller, a digital signal processor (DSP) or other device known in the art. The processor 610 typically performs logical and arithmetic operations based on program instructions stored within the memory 604.

The computing device 602 typically also includes one or more communication interfaces 606 for communicating with other electronic devices. The communication interfaces 606 may be based on wired communication technology, wireless communication technology, or both. Examples of different types of communication interfaces 606 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computing device 602 typically also includes one or more input devices 608 and one or more output devices 612. Examples of different kinds of input devices 608 include a keyboard, mouse, microphone, remote control device, button, joystick, trackball, touchpad, lightpen, etc. Examples of different kinds of output devices 612 include a speaker, printer, etc. One specific type of output device 612 which is typically included in a computer system is a display device 614. Display devices 614 used with embodiments disclosed herein may utilize any suitable image projection technology, such as a cathode ray tube (CRT), liquid crystal display (LCD), light-emitting diode (LED), gas plasma, electroluminescence, or the like. A display controller 616 may also be provided, for converting data stored in the memory 604 into text, graphics, and/or moving images (as appropriate) shown on the display device 614.

Of course, FIG. 6 illustrates only one possible configuration of a computing device 602. Various other architectures and components may be utilized.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A fingerprint reader, comprising:
an illumination source that produces light;
a camera;
an optical window;
an ambient light filter in contact with the optical window;
wherein the light from the illumination source enters the optical window at a total internal reflection angle, such that the light is reflected off a surface of the optical window by total internal reflection;
wherein when a person's finger is placed on the optical window, the light from the illumination source is frustrated by oils on ridges of the finger and is not reflected off the optical window;
wherein the filter allows the light from the illumination source to pass through the filter at the total internal reflection angle inside the optical window while reflecting ambient light coming from outside of the optical window so that the ambient light does not reach the camera;
wherein the ambient light can cancel or diminish the quality of a desired fingerprint to be imaged;
wherein the illumination source and the filter are designed so that the light from the illumination source contacts the filter within a desired range of angles, so that the light from the illumination source is not affected by the filter; and wherein the filter is designed so that the ambient light contacts the filter outside of the desired range of angles, so that the filter rejects the ambient light.

2. The fingerprint reader as in claim 1, wherein the filter is selected from the group consisting of dielectric elements, holographic elements, and diachronic elements.

3. The fingerprint reader as in claim 1 wherein the reader further comprises a holographic optical element, and wherein light from the illumination source passes through the holographic optical element prior to contacting the filter.

4. The fingerprint reader as in claim 1 wherein the surface of the filter is curved.

5. The fingerprint reader as in claim 1 wherein the filter is a holographic element that creates a curved wave front that effectively operates as a curved filter surface.

6. The fingerprint reader as in claim 1 wherein the filter is used in conjunction with a holographic optical element, and wherein the filter deflects zero order light that is produced by the holographic optical element away from the camera.

7. The fingerprint reader as in claim 1 wherein the camera is a CCD (charge-coupled device) that includes at least one camera filter.

8. The fingerprint reader of claim 1 wherein the filter is a thin film added to the top of the optical window.

9. The fingerprint reader of claim 1 wherein the reader digitally communicates a fingerprint image to a computing device.

10. The fingerprint reader of claim 1 further comprising a prism or glass block, wherein light from the source passes through the prism or glass block prior to reaching the optical window.

11. The fingerprint reader of claim 10 wherein the filter is added to a surface of the prism or glass block.

12. A method for increasing the sensitivity of a fingerprint reader, the method comprising:

obtaining a fingerprint reader, wherein the reader comprises:
an illumination source that produces light;
a camera;
an optical window;
an ambient light filter in contact with the optical window;
wherein the light from the illumination source enters the optical window at a total internal reflection angle, such that the light is reflected off a surface of the optical window by total internal reflection;
wherein when a person's finger is placed on the optical window, the light from the illumination source is frustrated by oils on ridges of the finger and is not reflected off the optical window;
wherein the filter allows the light from the illumination source to pass through the filter at the total internal reflection angle inside the optical window while reflecting ambient light coming from outside of the optical window so that the ambient light does not reach the camera;
wherein the ambient light can cancel or diminish the quality of a desired fingerprint to be imaged;
wherein the illumination source and the filter are designed so that the light from the illumination source contacts the filter within a desired range of angles, so that the light from the illumination source is not affected by the filter; and
wherein the filter is designed so that the ambient light contacts the filter outside of the desired range of angles, so that the filter rejects the ambient light;
using the filter to block the ambient light from reaching the camera.

13. The method as in claim 12, wherein the filter is selected from the group consisting of dielectric elements, holographic elements, and dichroic elements.

* * * * *